United States Patent [19]

Patton et al.

[11] Patent Number: 5,093,543

[45] Date of Patent: Mar. 3, 1992

[54] MOTOR PHASE INSULATION ARTICLE AND METHOD OF MAKING THE SAME

[75] Inventors: William T. Patton, Cypress, Tex.; Will T. Patton, Jr., Mableton, Ga.

[73] Assignee: Electrical Insulation Suppliers, Inc., Atlanta, Ga.

[21] Appl. No.: 604,618

[22] Filed: Oct. 26, 1990

[51] Int. Cl.⁵ .............................................. H01B 17/00
[52] U.S. Cl. ............................. 174/138 E; 174/138 R; 310/215
[58] Field of Search ....................... 174/138 E, 138 R; 310/215, 194, 260, 272; 336/209; 24/17 A, 129 B, 130; 156/211; 493/949, 957, 958, 968

[56] References Cited

U.S. PATENT DOCUMENTS

| | | | |
|---|---|---|---|
| 2,435,093 | 1/1948 | Mitschrich | 336/209 X |
| 2,455,862 | 12/1948 | Goldberg | 174/138 E X |
| 2,703,854 | 3/1955 | Eisler | 174/254 X |
| 2,858,514 | 10/1958 | Henderson et al. | 336/209 |
| 3,009,010 | 11/1961 | Stearns et al. | 174/254 X |
| 3,637,452 | 1/1972 | Sanders | 493/958 X |
| 4,639,977 | 2/1987 | Howard | 24/129 B X |

FOREIGN PATENT DOCUMENTS

| | | | |
|---|---|---|---|
| 260758 | 8/1963 | Australia | 220/62 |
| 424242 | 4/1974 | U.S.S.R. | 174/138 E |

Primary Examiner—Leo P. Picard
Assistant Examiner—Trinidad Korka
Attorney, Agent, or Firm—Jones, Askew & Lunsford

[57] ABSTRACT

A motor phase insulation device having folding legs that can be easily manufactured with minimum material wasted. The legs are formed from slits in the device material.

24 Claims, 5 Drawing Sheets

5,093,543

MOTOR PHASE INSULATION ARTICLE AND METHOD OF MAKING THE SAME

TECHNICAL FIELD

The invention relates to insulation, and more particularly to motor phase insulation.

BACKGROUND OF THE INVENTION

In a typical alternating current, induction motor, there is a stator and a rotor. Electrical energy is used to produce a magnetic field within the stator. The rotor is located within the magnetic field and rotates when the magnetic forces are operating. The magnetic field is created by a series of coils placed in alternating relationship within the stator. In order to maintain an effective magnetic field, each coil must be insulated from the other coils. This can be accomplished by placing insulation material between the coils.

In the mass production of electric motors, the coils are insulated by placing insulation in the form of tabs between the coils. The tabs, located at each end of the stator, are connected to one another by legs. The legs are placed in the slots along the length of the inner radius of the stator. In addition, the legs hold the tabs together so that the tabs do not fall off or misalign during or after assembly.

In the past, the insulation inserts have been made in many different shapes. Previous designs had a cut-out shape in the middle to form the legs that hold the tabs together. Although the design was effective, it was not cost effective to manufacture due to the large amount of material wasted on each piece.

Thus, there is a need for a motor phase insulation device that minimizes wastage.

There is a further need for a motor phase insulation device that can be easily mass-produced.

There is a further need for a motor phase insulation device that has folded legs that hold the ends of the insulation together.

There is a further need for a motor phase insulation device that has folded legs that do not rip or tear during assembly or installation.

SUMMARY OF THE INVENTION

The present invention solves the above-described problems by providing a motor phase insulation device manufactured from a narrow strip of insulating material and having folding legs formed by slitting the insulation strip.

Thus, it is an object of the present invention to provide an improved motor phase insulation device.

It is a further object of the present invention to provide a motor phase insulation device that is easy to mass-produce.

It is a further object of the present invention to provide a motor phase insulation device that minimizes wastage.

It is a further object of the present invention to provide a motor phase insulation device having folding legs that do not rip or tear during assembly and installation.

Other objects, features and advantages of the present invention will become apparent upon reading the following detailed description of the embodiments of the invention, when taken in conjunction with the drawings and appended claims.

BRIEF DESCRIPTION OF THE DRAWINGS

The invention will now be described with reference to the accompanying drawings which illustrate a preferred embodiment of the motor phase insulation article and method, falling within the scope of the appended claims, and in which:

DETAILED DESCRIPTION OF THE DRAWINGS

Figure 1:
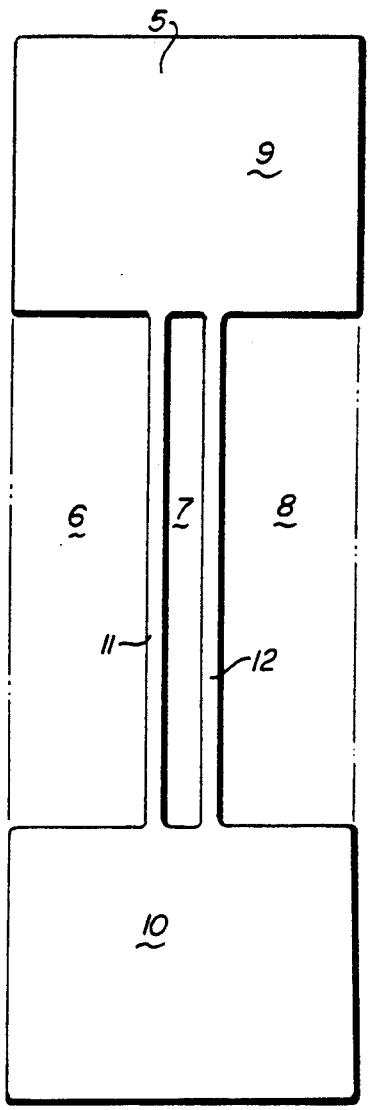
FIG. 1 is a front view of a prior art motor phase insulation article in its folded, manufactured position.

Referring now to FIG. 1 the prior art consists of a sheet of insulation material 5 with large sections 6,7,8 cut from it to form the tabs 9, 10 and legs 11, 12. The sections make up a considerable portion of the sheet, and the wastage consists of up to 40% of the sheet area. Thus, it was desired by manufacturers and consumers of motor phase insulation articles to develop an article with minimum wastage and consequentially reduced cost.

Figure 2:
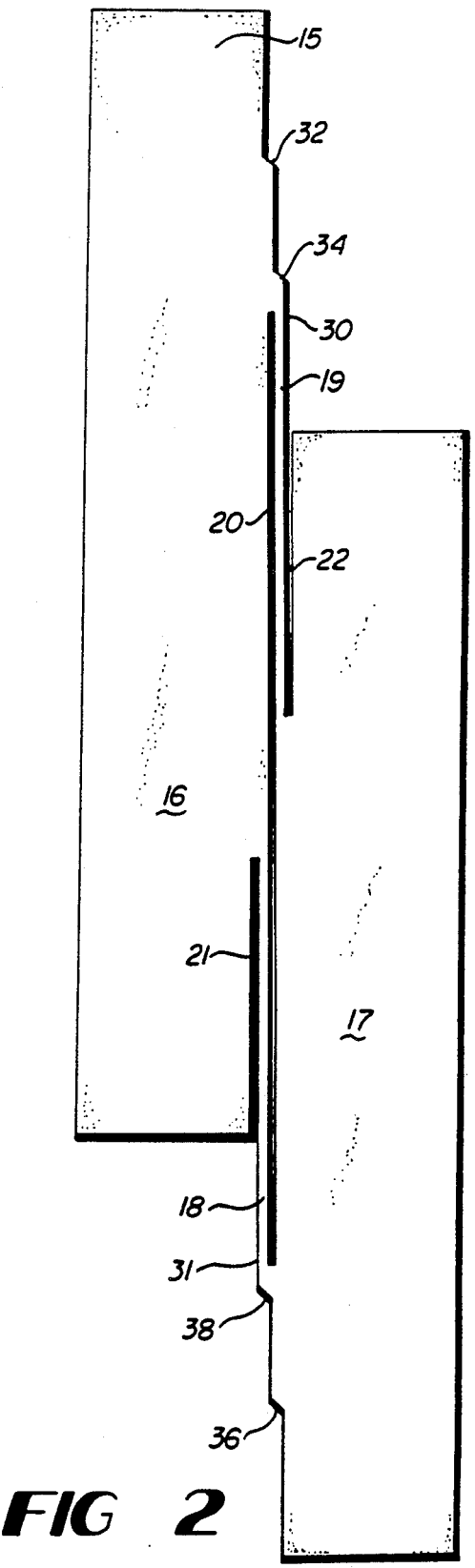
FIG. 2 is a front view of the motor phase insulation article of the invention in its folded, manufactured position.
Figure 3:
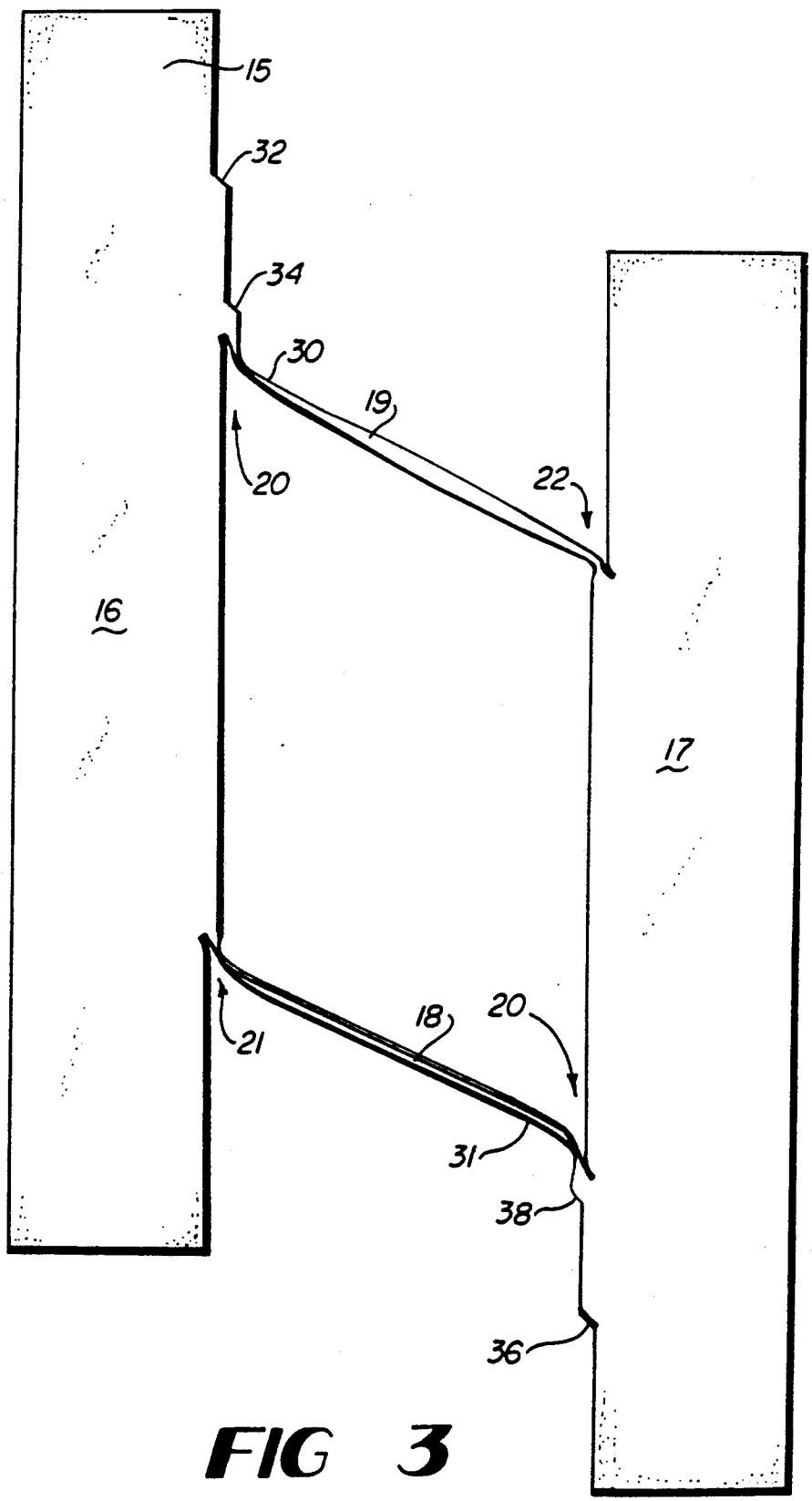
FIG. 3 is a pictorial view of the illustrated article in FIG. 2 in an unfolded position.

The motor phase insulation article of the present invention is shown in more detail in FIGS. 2 and 3. The motor phase insulation article 15 is made from a piece of insulation material. The article 15 has two main sections 16, 17 separated by legs 18, 19. The legs 18, 19 are formed by cutting slits 20-22 within the area of the article 15. For example, leg 18 is formed by cutting slits 20 and 21. Similarly, a second leg 19 is formed by slits 20 and 22.

Figure 4:
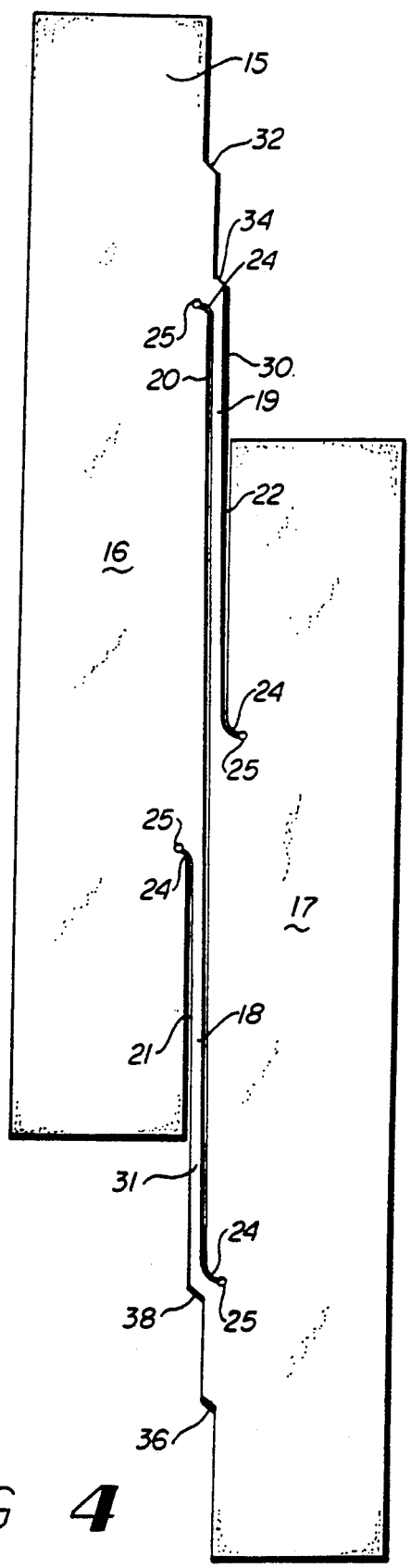
FIG. 4 is a front view of an alternative embodiment of FIG. 2.

To increase the tensile strength of the legs and relieve tear stress at the ends of the slits, the slits may be curved. FIG. 4 shows an alternative embodiment of the insulation article having curved slits. The curve 24 may be gradual and may move outwardly toward the outer edges of the article 15. Another effective stress relieving measure has been found to be the formation of small openings at the slit ends. As shown in the alternative embodiment, at the end of each curve is a small opening 25. When the article 15 is unfolded, the curves 24 and openings 25 help to alleviate stress at the ends of the slits and prevent ripping or tearing of the slit during assembly.

The inner edges of the article 15 are stepped. Inner edges 30, 31 have steps cut into the edges to provide thickness for the legs 18, 19 and to further alleviate wastage. Edge 30 has steps 32 and 34, and edge 31 has steps 36 and 38.

Figure 5:
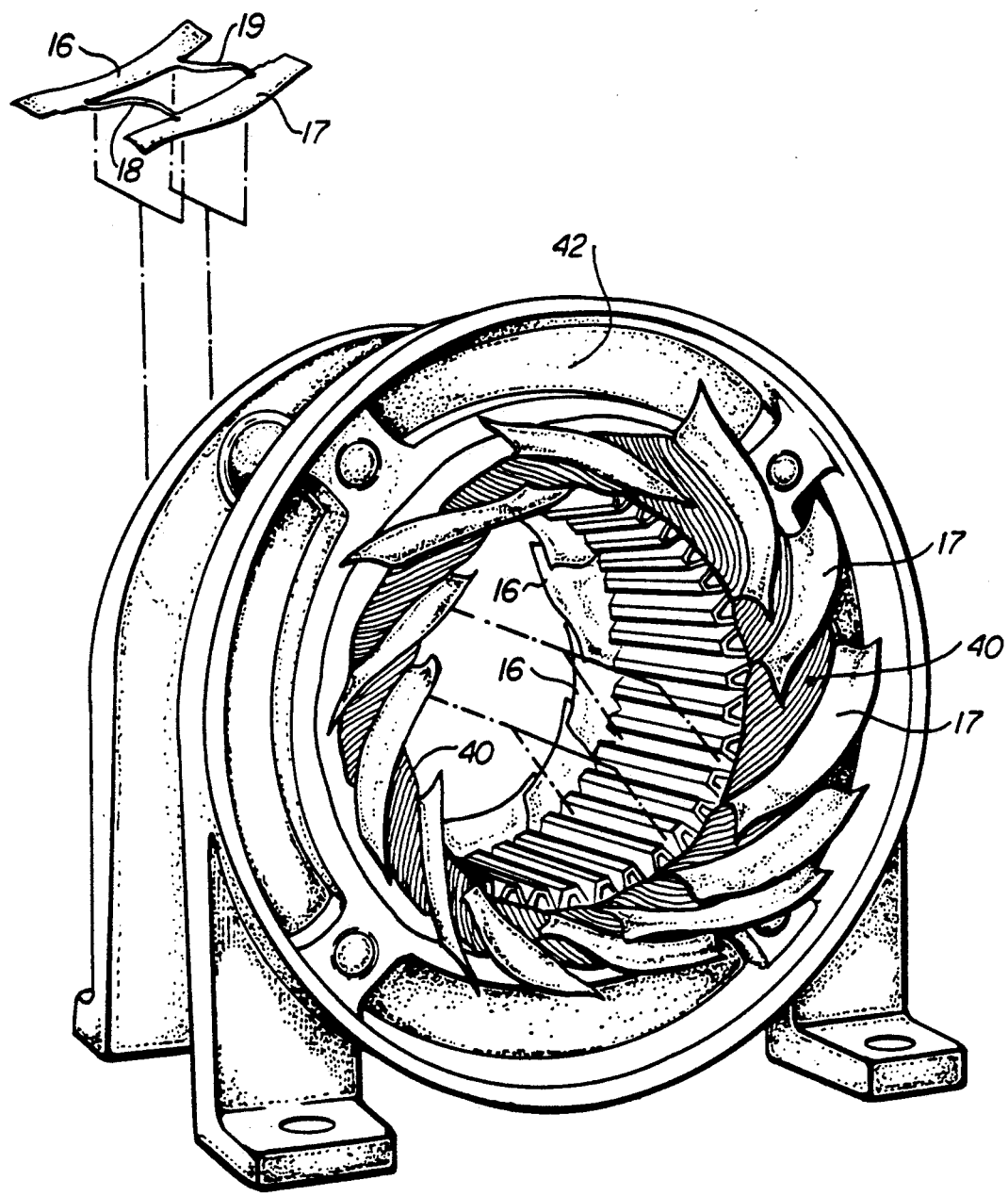
FIG. 5 is a pictorial view of the assembly of the preferred embodiment.

FIG. 5 shows the assembly of the insulation articles as they are being placed between coils 40. The legs 18 and 19 are unfolded to extend the length of the stator 42. The main sections 16 and 17 of the article 15 are separated by the legs 18, 19. The main sections 16 and 17 are placed between coil windings 40 and the legs 18 and 19 fit within the slots provided within the stator 42.

Figure 6:
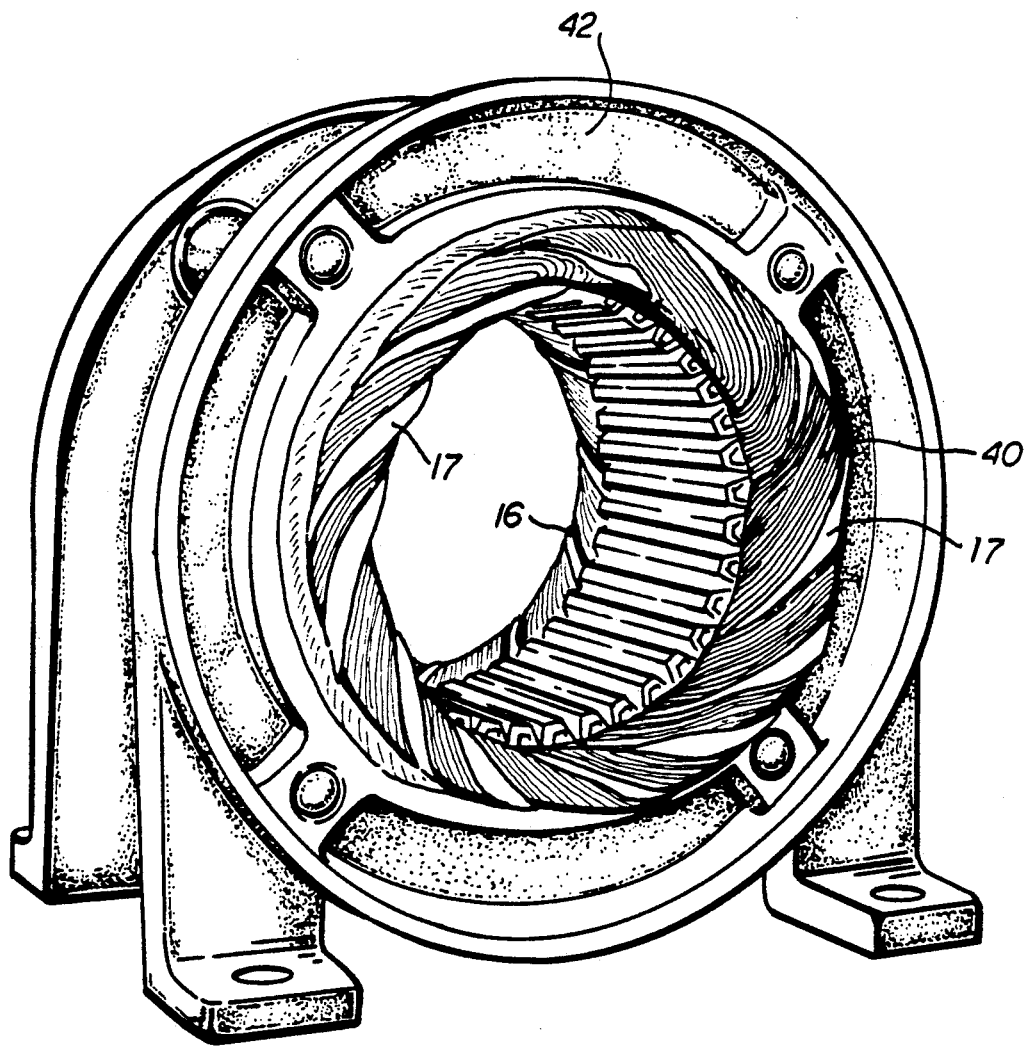
FIG. 6 is a pictorial view of the installation of the preferred embodiment.

Turning now to FIG. 6, the articles 15 are shown in their installed, secured position in a typical electric motor stator 42.

It will be appreciated that the embodiment discussed above is the preferred embodiment, and that various alternative embodiments are contemplated. It will be understood to anyone of ordinary skill in the art that the dimensions of the article are particular to each motor and any dimensional changes still come within the scope of the appended claims.

We claim:

1. An insulation article comprising:
   a piece of insulation having first and second edges and a length, the first edge being opposite from the second edge;
   a first slit originating at the first edge and continuing through along a portion of the length of the piece; and
   a second slit originating at the second edge and continuing along a portion of the length of the piece, whereby the slits coextend along a portion of the length of the piece so as to form a leg.

2. The article of claim 1 wherein the slits are curved.

3. The article of claim 1 wherein the end of the first slit has an opening.

4. The article of claim 1 wherein the end of the second slit has an opening.

5. A method of manufacturing a motor phase insulation article comprising the steps of:
   forming insulation material into a single piece, the piece having first and second edges and a length joining the first and second edges, the first edge being opposite the second edge;
   cutting a first slit beginning at the first edge and continuing along a portion of the length of the piece; and
   cutting a second slit beginning at the second edge and continuing along a portion of the length of the piece, the second slit to coextend with the first slit along a portion of the length of the piece.

6. The method of claim 5 further comprising the step of forming curvatures along the first slit.

7. The method of claim 5 further comprising the step of forming curvatures along the second slit.

8. The method of claim 5 further comprising the step of forming openings at the end of the first slit.

9. The method of claim 5 further comprising the step of forming openings at the end of the second slit.

10. An insulation article comprising:
    a piece of insulation having first and second edges, the first edge being opposite from the second edge, and a length joining the first edge to the second edge;
    a first slit originating at the first edge and continuing along a portion of the length of the piece;
    a second slit originating at the second edge and continuing through a portion of the length of the piece; and
    a third slit located away from the edges and between the first and second slits, its length coextending with a portion of the first slit and a portion of the second slit,
    whereby two legs are formed.

11. The article of claim 10 wherein the slits are curved.

12. The article of claim 10 wherein the edges are stepped.

13. A method of manufacturing a motor phase article comprising the steps of:
    forming insulation materials into a single piece, the piece having a first and second edge, and a length, the first edge being opposite the second edge, and the length joining the first and second edge;
    cutting a first slit beginning at the first edge and continuing along a portion of the length of the piece;
    cutting a second slit beginning at the second edge and continuing along a portion of the length of the piece; and
    cutting a third slit aware from the edges and between the first and second slits and along a portion of the length of the piece so that the third slit coexists with a portion of the first slit and a portion of the second slit.

14. The method of claim 13 further comprising the step of forming curvatures along the slits.

15. The method of claim 13 wherein the first, second and third slits are parallel.

16. The method of claim 13 wherein the edges are stepped.

17. A motor phase insulation article comprising:
    a piece of insulation having first and second edges, a length joining the first and second edges;
    a first slit originating at the first edge, continuing along a portion of the length of the piece and terminating before reaching the second edge;
    a second slit in spaced relation with the first slit, the second slit originating at the second edge, continuing along a portion of the length of the piece and terminating before reaching the first edge; and
    a third slit located away from the edges of the piece and between the first and second slits, the third slit coextending with portions of the first and second slits.

18. The article of claim 1 wherein the ends of the slits are curved.

19. The method of claim 5 further comprising the step of forming curvatures at the end of the first slit.

20. The method of claim 5 further comprising the step of forming curvatures at the end of the second slit.

21. The article of claim 10 wherein the ends of the slits are curved.

22. The method of claim 13 further comprising the step of forming curvatures at the ends of the slits.

23. The article of claim 17 wherein the ends of the slits are curved.

24. A motor phase insulation article comprising:
    a piece of insulation having first and second edges, a length joining the first and second edges;
    a first slit originating at the first edge, continuing along a portion of the length of the piece and terminating before reaching the second edge;
    a second slit in spaced relation with the first slit, the second slit originating at the second edge, continuing along a portion of the length of the piece and terminating before reaching the first edge; and
    a plurality of slits located away from the edges of the piece and between the first and second slits, the length of each of the plurality of slits coextending with a portion of the length of the first and second slits.

* * * * *